United States Patent Office 2,885,413
Patented May 5, 1959

2,885,413

11-OXYGENATED ESTRADIOL COMPOUNDS AND DERIVATIVES

John A. Hogg, Kalamazoo Township, and Jerome Korman, Portage Township, Kalamazoo County, Mich., assignors to The Upjohn Company, Kalamazoo, Mich., a corporation of Michigan No Drawing. Application December 17, 1956
Serial No. 628,550

5 Claims. (Cl. 260—397.45)

This invention relates to steroid compounds and is more particularly concerned with novel estradiol compounds represented by the structural formula

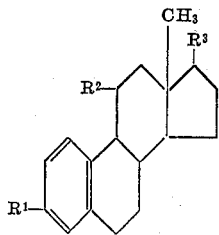

wherein $R^1$ is selected from the group consisting of hydroxy, etherified hydroxy, and esterified hydroxy; $R^2$ is selected from the group consisting of α- and β-hydroxy, esterified α- and β-hydroxy, keto, and hydrogen attached to a 9(11)-double bond; and $R^3$ is selected from the group consisting of hydroxy and esterified hydroxy.

This application is a continuation-in-part of our copending application Serial No. 406,364, filed January 26, 1954, now U.S. Patent Number 2,774,775.

It is an object of the present invention to provide the novel estradiol compounds of the foregoing formula, as herein described, which compounds, e.g. 3,11β,17β-trihydroxy-1,3,5(10)-estratriene etc., have estradiol-like activity, e.g. estrogenic activity, and are further useful in the production of compounds having estrogenic activity, e.g. 3,17β - dihydroxy - 1,3,5(10),9(11) - estratetraene is converted to estradiol by hydrogenation of the 9(11)-double bond, or other hormone activity, e.g. by the Birch reduction method 3 - methoxy - 11β,17β - dihydroxy-1,3,5(10)-estratriene is converted to 11β-hydroxy-19-nortestosterone, 3-methoxy-17β-hydroxy-1,3,5(10),9(11)-estratetraene is converted to 19-nortestosterone, etc. Other objects and uses will be apparent to one skilled in the art.

In the compounds of the present invention as represented by the foregoing structural formula preferably the etherified and esterified hydroxy groups are hydrocarbonoxy [hydrocarbon-O—] and hydrocarbonoyloxy

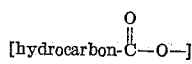

[hydrocarbon-C—O—]

radicals, respectively, each containing less than twelve carbon atoms. In an especially preferred embodiment of this invention said radicals are alkoxy and alkanoyloxy radicals, respectively, each containing less than nine carbon atoms. The most preferred embodiment of said radicals are methoxy and acetoxy, respectively. Illustrative etherified hydroxy radicals are methoxy, ethoxy, propoxy, butyroxy, valeroxy, hexoxy, heptoxy, octanoxy, β-trichloro-α-acetylethoxy, chloromethoxy, β-hydroxyethyleneoxy, dimethylmethoxy, diethylmethoxy, isobutyroxy, isovaleroxy, α-tetrahydropyranyloxy, α and β-naphthyloxy, cyclohexyloxy, cyclopentyloxy, β,β-dicarbethoxyethenyloxy, β-ketocyclohexenyloxy, α,β-dimethylethoxy, α,β- and β,β-diethylethoxy, benzoxy, ortho, meta and para-tolyloxy, α and β-phenylethyloxy, β-indolyloxy, α-furyloxy, α and β-cyclohexylethyleneoxy, ortho, meta and para-nitrobenzoxy, ortho, meta and para-aminobenzoxy, etc. Illustrative esterified hydroxy radicals are those containing acyl radicals of the acids formic, acetic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α-ethylisovaleric, cyclopropylideneacetic, cyclopentylformic, cyclopentylacetic, α and β-cyclopentylpropionic, cyclohexylformic, cyclohexylacetic, α and β-cyclohexylpropionic, benzoic, 2, 3 or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, phenylacetic, α and β-phenylpropionic, diphenylacetic, triphenylacetic, succinic, glutaric, α-methylglutaric, β-methylglutaric, β,β-dimethylglutaric, adipic, pimelic, suberic, glycolic, lactic, citric, tartaric, d-maleic, d-glyceric, malonic, gluconic, salicylic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acid, phenylcarbamic, n-butylcarbamic, dimethylcarbamic, diethylcarbamic, allophanic, α and β-furylcarboxylic, N - methylpyrrolidyl - 2 - carboxylic, α - picolinic, indole - 2 -carboxylic, 6 -hydroxy - indolyl-3-acetic, N-methylmorpholyl-2-carboxylic, pyrrolyl-2-carboxylic, etc.

Illustrative compounds of the present invention are the following wherein etherified and esterified hydroxyl groups are those specified in the foregoing description: 3,11α(and β),17β-trihydroxy-1,3,5(10)-estratriene (i.e. 11α- and 11β-hydroxyestradiol) and 3-, 11-, and 17-monoesters, 3,11-, 3,17-, and 11,17-diesters, and 3,11,17-triesters thereof; 3-etherified 3,11α(and β),17β-trihydroxy-1,3,5(10)-estratriene (i.e. 11α- and 11β-hydroxyestradiol 3-ether) and 11- and 17-monoesters and 11,17-diesters thereof; 3,17β-dihydroxy-1,3,5(10)-estratrien-11-one (i.e. 11-ketoestradiol) and the 3- and 17-monoesters and 3,17-diesters thereof; 3-etherified 3,17β-dihydroxy-1,3,5(10)-estratrien-11-one (i.e. 11-ketoestradiol 3-ether) and 17 - monoesters thereof; 3,17β - dihydroxy-1,3,5(10),9(11)-estratetraene (i.e. 9(11)-dehydroestradiol) and the 3- and 17-monoesters and 3,17-diesters thereof; 3-etherified 3,17β-dihydroxy-1,3,5(10), 9(11)-estratetraene (i.e. 9(11)-dehydroestradiol 3-ether) and 17-monoester thereof.

The novel estradiol compounds of this invention can be prepared by reduction of the 17-keto group to an 11β-hydroxy group in a corresponding estrone compound, as described in our copending application Serial No. 406,364, and as illustrated in the examples, e.g. Example 1, in this specification. Modifications of this method also can be employed to produce the compounds of this invention, as illustrated in the examples. Various other conversions, e.g. esterification, etherification, ester hydrolysis, oxidation of hydroxy to keto groups, etc., are employed, when appropriate or desirable, to produce compounds of this invention, as also illustrated in the examples. The starting compounds of this invention can be prepared as described in our copending applications Serial No. 406,364, filed January 26, 1954, and Serial No. 628,477, filed December 1956.

The following examples are illustrative only and are not to construed as limiting the scope of the present invention.

Example 1.—*3,11α,17β-trihydroxy-1,3,5(10)-estratriene*

A solution of 310 milligrams of 3,11α - diacetoxy-1,3,5(10)-estratrien-17-one in five milliliters of benzene and fifteen milliliters of ether is added to 0.5 gram of lithium aluminum hydride in fifty milliliters of ether. The reaction mixture obtained is heated for one hour under reflux and then hydrolyzed by addition of dilute aqueous hydrochloric acid solution. The crude solid obtained weighs 213 milligrams. Recrystallization from methanol-ethyl acetate mixture and from ethyl acetate alone provides highly purified 3,11α,17β-trihydroxy-1,3,5(10)-estratriene melting at 250 to 251 degrees centigrade.

*Analysis.*—Calc'd for $C_{18}H_{24}O_3$: C, 74.97; H, 8.39. Found: C, 75.27; H, 8.23.

In the same manner other 3,11α-diacyloxy-1,3,5(10)-estratrien-17-ones including those wherein the 3 and 11α-acyloxy radicals are the esterified hydroxy groups named in the foregoing specification, are converted to 3,11α,17β-trihydroxy-1,3,5(10)-estratriene.

3,11α,17β-trihydroxy-1,3,5(10)-estratriene is converted to 11α-hydroxy-19-nortestosterone as shown in Example 3.

*Example 2.—3,11α,17β-trihydroxy-1,3,5(10)-estratriene*

3,11α-dihydroxy-1,3,5(10)-estratrien-17-one is reduced with lithium aluminum hydride to 3,11α,17β-trihydroxy-1,3,5(10)-estratriene following the procedure of Example 1 for reducing 3,11α-diacetoxy-1,3,5(10)-estratrien-17-one to 3,11α,17β-trihydroxy-1,3,5(10)-estratriene, the compounds obtained being identical, melting point 250 to 251 degrees centigrade.

*Example 3.—3-methoxy-11α,17β-dihydroxy-1,3,5(10)-estratriene*

A solution of 520 milligrams of the 3,11α,17β-trihydroxy-1,3,5(10)-estratriene in a mixture of 25 milliliters of methanol and five milliliters of water containing three grams of potassium hydroxide is cooled to five degrees centigrade and four additions of 1.5 milliliters each of dimethyl sulfate are made at thirty-minute intervals. The methanol solvent is then removed in a stream of air providing partially crystalline product. Chromatographic purification of a methylene dichloride solution of the product over forty grams of magnesium silicate (Florisil) gives 400 milligrams of product eluted with hexane (Skellysolve B) containing twenty percent acetone. Two recrystallizations from ether provides purified 3-methoxy-11α,17β-dihydroxy-1,3,5(10-estratriene melting at 144 to 145 degrees centigrade.

*Analysis.*—Calc'd for $C_{19}H_{26}O_3$: C, 75.46; H, 8.67. Found: C, 75.56; H, 8.70.

In the same manner are prepared, using the appropriate etherifying agent, other 3-etherified 3,11α,17β-trihydroxy-1,3,5(10)-estratrienes, including those wherein the 3-ether radicals are the etherified hydroxy radicals named in the foregoing description.

Four hundred milligrams of lithium metal is added to a solution of 400 milligrams of the 3-methoxy-11α,17β-dihydroxy-1,3,5,(10)-estratriene in a mixture of 35 milliliters of anhydrous ether and 25 milliliters of liquid ammonia cooled in a Dry Ice-acetone bath. When the metal is dissolved, four milliliters of absolute ethanol is added during a thirty-minute period. The ammonia then is evaporated and water added. The oily product obtained is dissolved in a mixture of 25 milliliters of methanol, three milliliters of water and one milliliter of concentrated hydrochloric acid, and heated under reflux for thirty minutes. Evaporation of the methanol solvent provides crude product which, dissolved in methylene dichloride, is chromatographed over magnesium silicate (Florisil) to provide 178 miligrams of product melting at 168 to 172 degrees centigrade, the product being eluted with a mixture of equal parts of acetone and hexane (Skellysolve B). Recrystallization of this product from actone provides 11α-hydroxy-19-nortestosterone melting at 179 to 181 degrees centigrade.

*Example 4.—3-methoxy-11α,17β-dihydroxy-1,3,5(10)-estratriene*

By lithium aluminum hydride reduction 3-methoxy-11α-hydroxy-1,3,5(10)-estratriene - 17 - one is converted to 3 - methoxy-11α,17β-dihydroxy-1,3,5(10)-estratriene following the procedure of Example 1 for the reduction of 3,11α-diacetoxy-1,3,5(10)-estratrien-17-one to 3,11α,17β-trihydroxy-1,3,5(10)-estratriene. The 3-methoxy-11α,17β-dihydroxy-1,3,5(10)-estratriene obtained is identical with the same compound prepared by another procedure in Example 3 and is convertible to 11α-hydroxy-19-nortestosterone, melting point 180 to 181 degrees centigrade, as shown in Example 3.

In the same manner are prepared other 3-etherified 3,11α,17β-trihydroxy - 1,3,5(10) - estratrienes, including those wherein the 3-ether radicals are the etherified hydroxy radicals named in the foregoing description.

*Example 5.—3,11α,17β-triacetoxy-1,3,5(10)-estratriene*

A solution of 3,11α,17β-trihydroxy-1,3,5(10)-estratriene and a large excess of acetic anhydride in dry pyridine solvent is maintained at room temperature for eighteen hours. The solution then is poured into a mixture of ice and water to obtain oily product which is extracted with methylene dichloride. Chromatographic purification over magnesium silicate (Florisil) using acetone-hexane (Skellysolve B) mixtures for elution provides crystalline 3,11α,17β-triacetoxy-1,3,5(10)-estratriene.

In the same manner are prepared, using the appropriate acylating agent, other 3,11α,17β-triacyloxy-1,3,5(10)-estratrienes, including those wherein the 3, 11α, and 17β-acyloxy radicals are the esterified hydroxy groups named in the foregoing description.

*Example 6.—3-methoxy-11α,17β-diacetoxy-1,3,5(10)-estratriene*

Following the acylation procedure of Example 5, 3-methoxy - 11α,17β - dihydroxy-1,3,5(10)-estratriene is acetylated with acetic anhydride in pyridine to produce 3-methoxy-11α,17β-diacetoxy-1,3,5(10)-estratriene.

In the same manner are prepared, using the appropriate acylating agent, other 11α,17β-diesters of 3-etherified 3,11α,17β-trihydroxy - 1,3,5(10) - estratriene, including those wherein the 3-ether radicals are the etherified hydroxy radicals named in the foregoing description and the 11α and 17β-ester radicals are the estrified hydroxy groups named in the foregoing description.

*Example 7.—3,11β,17β-trihydroxy-1,3,5(10)-estratriene*

A mixture of 1.04 grams of 3,11β-diacetoxy-1,3,5(10)-estratrien-17-one, twenty milliliters of benzene and 75 milliliters of ether is reduced with 1.5 grams of lithium aluminum hydride by heating under reflux for one hour. Then ten milliliters of ethyl acetate is added followed by careful addition of water until a heavy precipitate is formed. The precipitate is stirred with a mixture of forty milliliters of water and ten milliliters of concentrated hydrochloric acid, then washed with water and dried. The crude 3,11β,17β-trihydroxy-1,3,5(10)-estratriene weighs 470 milligrams and melts at 280 to 290 degrees centigrade. Recrystallization of the compound from ethyl acetate provides purified compound melting at 285 to 288 degrees centigrade having a rotation $[\alpha]_D^{24}$ of plus 129 degrees in dioxane.

*Analysis.*—Calc'd for $C_{18}H_{24}O_3$: C, 74.97; H, 8.39. Found: C, 75.18; H, 8.50.

*Example 8.—3-methoxy-11β,17β-dihydroxy-1,3,5(10)-estratriene*

3-methoxy-11β,17β-dihydroxy-1,3,5(10) - estratriene is prepared by methylation of 3,11β,17β-trihydroxy-1,3,5-(10)-estratriene according to the same procedure as 3-methoxy-11α,17β-dihydroxy-1,3,5(10) - estratriene is prepared from 3,11α,17β-trihydroxy-1,3,5(10)-estratriene in Example 3.

In the same manner are prepared, using the appropriate etherifying agents, other 3-etherified 3,11β,17β-trihydroxy-1,3,5(10)-estratrienes, including those wherein the 3- ether radicals are those etherified hydroxy radicals named in the foregoing description.

The 3-methoxy-11β,17β-dihydroxy-1,3,5(10)-estratriene is converted to 11β-hydroxy-19-nortestosterone according to the same procedure as the corresponding 11α-hydroxy compound is converted to 11α-hydroxy-19-nortestosterone as described in Example 3.

Example 9.—3,17β-diacetoxy-11β-hydroxy-1,3,5(10)-estratriene

A solution of 3,11β,17β-trihydroxy-1,3,5(10)-estratriene in pyridine is reacted with two molar equivalents of acetic anhydride at room temperature (approximately twenty to thirty degrees centigrade) for four hours. The solution then is poured into a mixture of ice and water to obtain oily product which is extracted with methylene chloride and then chromatographed over magnesium silicate (Florisil) using hexane (Skellysolve B)-acetone mixture for elution to provide 3,17β-diacetoxy-11β-hydroxy-1,3,5(10)-estratriene.

In the same manner are prepared, using the appropriate acylating agent, other 3,17β-diacyloxy-11β-hydroxy-1,3,5-(10)-estratrienes, including those wherein the 3 and 17-acyloxy radicals are the esterified hydroxyl radicals named in the foregoing description.

Example 10.—3,17β-diacetoxy-1,3,5(10)-estratrien-11-one

A solution of six milligrams of chromic anhydride, one milliliter of acetic acid, and one drop of water is added to a solution of twenty milligrams of 3,17β-diacetoxy-11β-hydroxy-1,3,5(10)-estratriene in 0.5 milliliter of acetic acid. After reacting for thirty minutes the solution is diluted with water and extracted with methylene dichloride. The extract is chromatographed over magnesium silicate (Florisil), using hexane (Skellysolve B)-acetone mixtures for elution, to provide 3,17β-diacetoxy-1,3,5(10)-estratrien-17-one.

In the same manner are prepared other 3,17β-diacyloxy-1,3,5(10)-estratrien-11-ones, including those wherein the 3 and 17β-acyloxy radicals are the esterified hydroxyl radicals named in the foregoing description.

Example 11.—3,17β-dihydroxy-1,3,5(10)-estratrien-11-one

A solution of fifty milligrams of 3,17β-diacetoxy-1,3,5(10)-estratrien-11-one in ten milliliters of methanol containing twenty milligrams of sodium methoxide is reacted at room temperature (approximately from twenty to thirty degrees centigrade) for one hour. The solution then is neutralized with a few drops of acetic acid and the solvent evaporated. Chromatography of the residue, in methylene dichloride solution, over magnesium silicate (Florisil) using hexane (Skellysolve B)-acetone mixtures for elution provides 3,17β-dihydroxy-1,3,5(10)-estratrien-11-one.

Example 12.—3,17β-dihydroxy-1,3,5(10),9(11)-estratetraene

Treatment of 3-hydroxy-1,3,5(10),9(11)-estratetraen-17-one with lithium aluminum hydride, according to the procedure of Example 1 for the reduction of 3,11α-diacetoxy-1,3,5(10)-estratrien-17-one to 3,11α,17β-trihydroxy-1,3,5(10)-estratriene, provides 3,17β-dihydroxy-1,3,5(10),9(11)-estratetraene.

The 3,17β-dihydroxy-1,3,5(10),9(11)-estratetraene is converted to estradiol as follows: A solution of fifty milligrams of 3,17β-dihydroxy-1,3,5(10),9(11)-estratetraene in ten milliliters of glacial acetic acid and containing 25 milligrams of platinum oxide is shaken with hydrogen for thirty minutes. The catalyst then is removed by filtration and the solvent evaporated. The residue is recrystallized from ethyl acetate to provide estradiol melting at 170 to 175 degrees centigrade.

Example 13.—3-methoxy-17β-hydroxy-1,3,5(10),9(11)-estratetraene

Lithium aluminum hydride reduction of 3-methoxy-1,3,5(10),9(11)-estratetraen-17-one provides 3-methoxy-17β-hydroxy-1,3,5(10),9(11)-estratetraene, the lithium aluminum hydride reduction procedure of Example 1 being followed.

In the same manner are prepared other 3-etherified 3,17β-dihydroxy-1,3,5(10),9(11)-estratetraenes, including those wherein the 3-ethers are the etherified hydroxyl radicals named in the foregoing description.

By the catalytic hydrogenation method described in Example 12, estradiol 3-methyl ether is obtained from the 3-methoxy-17β-hydroxy-1,3,5(10),9(11)-estratetraene.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. Estradiol compounds of the formula

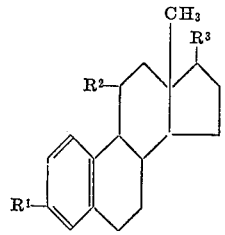

wherein $R^1$ is selected from the group consisting of hydroxy, hydrocarbonoxy, and hydrocarbonoyloxy; $R^2$ is selected from the group consisting of hydroxy, hydrocarbonoyloxy, keto, and hydrogen attached to a 9(11)-double bond; and $R^3$ is selected from the group consisting of hydroxy and hydrocarbonoyloxy; the hydrocarbonoxy and hydrocarbonoyloxy radicals each containing less than twelve carbon atoms.

2. 11-ketoestradiol.
3. 9(11)-dehydroestradiol.
4. 11β-hydroxyestradiol.
5. 11α-hydroxyestradiol.

References Cited in the file of this patent
UNITED STATES PATENTS
2,756,179    Fried et al. _____ July 24, 1956